US 8,824,598 B2

(12) United States Patent
Dimou et al.

(10) Patent No.: US 8,824,598 B2
(45) Date of Patent: Sep. 2, 2014

(54) SYSTEM AND METHOD FOR COMMUNICATING INFORMATION IN A WIRELESS NETWORK (71) Applicant: Telefonaktiebolaget L M Ericsson (Publ), Stockholm (SE)

(72) Inventors: Konstantinos Dimou, Stockholm (SE); Yu Yang, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/717,864

(22) Filed: Dec. 18, 2012

(65) Prior Publication Data

US 2014/0169500 A1    Jun. 19, 2014

(51) Int. Cl.
H03K 9/00    (2006.01)
H04L 27/00    (2006.01)

(52) U.S. Cl.
USPC ............................ 375/316; 370/335; 370/338

(58) Field of Classification Search
CPC ..... H04B 1/30; H04L 27/2647; H04N 5/4401
See application file for complete search history.

(56) References Cited

U.S. PATENT DOCUMENTS 6,266,363 B1 *   7/2001   Hiramatsu ..................... 375/141
2008/0155148 A1 *   6/2008   Oyman .......................... 710/106
2011/0075645 A1 *   3/2011   Yano et al. ..................... 370/338

* cited by examiner

Primary Examiner — Leon-Viet Nguyen (57) ABSTRACT

A method for receiving data transmitted wirelessly includes receiving information indicating a device type associated with a wireless communication device and, based on the device type associated with the wireless communication device, deciding to request information indicating a set of possible data values associated with transmissions from the wireless communication device. The method further includes receiving information indicating the set of possible data values and receiving a data transmission from the wireless communication device that comprises encoded data bits. Additionally, the method includes attempting to decode the data transmission using the set of possible data values.

16 Claims, 5 Drawing Sheets

SYSTEM AND METHOD FOR COMMUNICATING INFORMATION IN A WIRELESS NETWORK

TECHNICAL FIELD OF THE INVENTION

This disclosure relates in general to wireless communication and, more particularly, to improving the reliability of wireless transmissions.

BACKGROUND OF THE INVENTION

Machine-to-machine (M2M) communication is becoming an increasingly critical consideration in the development of future communication technologies. In M2M communications, machine type communication (MTC) devices such as smart meters, signboards, cameras, remote sensors, laptops, and appliances are connected to the communication network. These devices may differ dramatically from conventional communication devices. Many MTC devices are designed to transmit sporadic bursts of one or a few short packets containing measurements, reports and triggers, such as temperature, humidity, or wind speed readings. In most cases, MTC devices are expected to be installed in a fixed location or to have low mobility. MTC devices are typically low-complexity devices, targeting low-end (low average revenue per user, low data rate, high latency tolerance) applications. These devices often have severe limitations on power/energy consumption as well.

Because of these features, the M2M services defined by the 3GPP Long Term Evolution (LTE) standards and other communication standards place very different requirements on a wireless network from those of traditional services, such as voice and web streaming. These differences are compounded by the fact that wireless networks supporting M2M communication may be required to serve a significantly larger number of devices than is typical in conventional wireless networks, as MTC devices are expected to be cheap and widely deployed. As a result, designing for M2M/MTC communications in wireless communication networks creates several challenges and there is an increasing need for cost-, spectrum- and energy-efficient radio access solutions for M2M applications.

In conventional wireless communication systems, for example LTE systems, the processing of received data at the receiver (i.e. base station or relay node or other reception point) typically includes:
  receiving the signal from a user equipment (UE) or other wireless device;
  demodulating the received signal to a baseband signal;
  applying OFDM demodulation and cyclic prefix removal to map symbols into different physical resource blocks;
  descrambling the demodulated signal with a UE-specific sequence;
  performing rate de-matching;
  decoding the signal (e.g., at the physical layer, typically turbo coding), using a known channel de-coding scheme; and
  confirming that an error detection check (e.g., a check cyclic redundancy check (CRC)) is successful.

If the CRC check succeeds, the sequence of bits (usually in the form of transport blocks) are passed from the physical layer to the media access control (MAC) layer for further processing. The receiver may also transmit feedback information (e.g., an acknowledgement (ACK) indication) confirming successful reception. If the CRC check fails, the received signal is maintained at the receiver and a re-transmission may be requested. For example, the receiving node may request re-transmission by sending a feedback information indicating the transmission failed (e.g., a negative acknowledgement ("NACK") indication) to the transmitting device.

Given the currently available solutions and the constraints associated with supporting MTC services, providing coverage to a large number of MTC devices would likely require a massive deployment of base stations (macro, micro, pico or femto stations) or relay nodes, or the use of extremely powerful base stations with advanced receivers that possess several receiver antennas capable of collecting the weak signals from MTC devices and of using advanced radiofrequency processing to overcome the difficulties. However, both of these solutions would require great expense and significant installation effort by network operators. As a result, there is a need for efficient communication methods for M2M systems that can more effectively handle a dramatic increase in the number of MTC devices to be supported and the amount of MTC traffic.

SUMMARY OF THE INVENTION

In accordance with the present disclosure, certain disadvantages and problems associated with wireless communication have been substantially reduced or eliminated. In particular, certain devices and techniques for providing wireless telecommunication service are described.

In accordance with one embodiment of the present disclosure, a method of operating a wireless communication terminal includes receiving information indicating a device type associated with a wireless communication device and, based on the device type associated with the wireless communication device, deciding to request information indicating a set of possible data values associated with transmissions from the wireless communication device. The method also includes receiving information indicating the set of possible data values and receiving a data transmission from the wireless communication device that comprises encoded data bits. Additionally, the method includes attempting to decode the data transmission using the set of possible data values.

In accordance with another embodiment of the present disclosure, a method of operating a network node in a wireless access network includes encoding a set of data bits in accordance with a first encoding scheme and transmitting a first data transmission to a radio network node. The first data transmission includes the set of data bits encoded in accordance with the first encoding scheme. The method further includes receiving feedback information indicating that the first data transmission was not successfully decoded by the radio network node. Additionally, the method involves, in response to the feedback information, encoding the set of data bits in accordance with a second encoding scheme according to which each of a set of possible data values for the set of data bits is associated with a code word based on a likelihood of transmission and transmitting a second data transmission to the radio network node. The second data transmission comprises the set of data bits encoded in accordance with the second encoding scheme.

Important technical advantages of certain embodiments of the present invention include improving the reliability of wireless communications. Particular embodiments may be capable of reducing the number of erroneous transmissions made by wireless devices, increasing the likelihood that wireless transmissions are error-free, and/or limiting the control signaling overhead associated with retransmissions. Particular embodiments may increase the link budget of the wireless communication network. Additionally, in particular embodiments, a wireless device may be able to achieve a given error rate on its transmission using a lower transmission power and/or a lower target signal to interference plus noise ratio (SINR). Furthermore, the described solutions may allow for the use of less complex and less expensive wireless communication devices. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
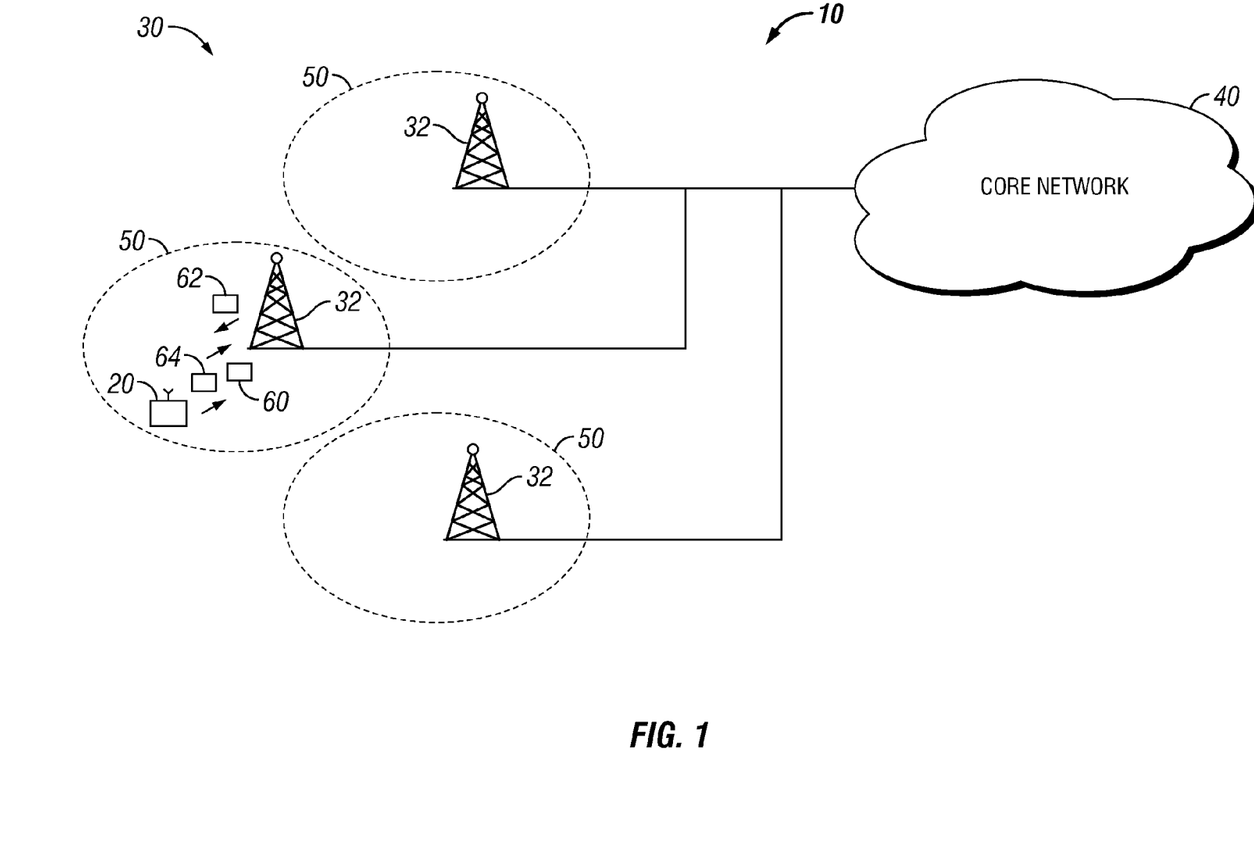
FIG. 1 illustrates a particular embodiment of a wireless communication system in which the described solutions may be implemented.

FIG. 1 illustrates a wireless communication system 10 that provides communication service to one or more wireless communication devices 20. Wireless communication system 10 includes an access network 30 that provides wireless access to communication services within a particular geographic area and a core network 40 that provides backhaul delivery of information within wireless communication system 10. As part of utilizing the communication services provided by wireless communication system 10, wireless communication device 20 transmits data values generated or collected by wireless communication device 20. As explained further below, wireless communication system 10 may leverage knowledge about the data values transmitted by wireless communication device 20 to improve the transmission and/or reception techniques utilized in wireless communication system 10. In particular embodiments, this may improve the likelihood of successful transmissions and reduce the overhead associated with re-transmissions.

In the example embodiment illustrated in FIG. 1, wireless communication system 10 provides wireless communication service to one or more wireless communication devices 20 operating within a plurality of cells 50, each representing a geographic area associated with wireless communication system 10. Wireless communication system 10 may support communication of any suitable type and/or in accordance with any appropriate communication standards including, but not limited to, any Long Term Evolution (LTE), Worldwide Interoperability for Microwave Access (WiMAX), and Wideband Code Division Multiple Access (WCDMA) communication standards.

Wireless communication device 20 represents any device capable of communicating information wirelessly with wireless communication system 10. Examples of wireless communication device 20 include traditional communication devices such as wireless phones, personal digital assistants ("PDAs"), laptop computers, and any other portable communication device suitable for use with communication system 10. For example, in particular embodiments, wireless communication device 20 represents an instance of LTE user equipment (UE). Additionally, in particular embodiments, wireless communication device 20 may also represent automated equipment or devices capable of machine type communication (MTC). For example, wireless communication device 20 may represent a wireless meter or sensor, a digital billboard, a wireless-capable appliance (e.g., a washing machine, oven, digital video recorder (DVR)), or any other device capable of wireless communication with access network 30.

Access network 30 communicates wirelessly with wireless communication devices 20 and serves as an interface between wireless communication devices 20 and core network 40. Access network 30 may represent or include a radio access network and/or any elements responsible for providing a radio or air interface for core network 40. For example, in the illustrated embodiment, access network 30 includes one or more base stations 32. Access network 30 may also include base station controllers, access servers, gateways, relays, repeaters, and/or any additional components suitable for managing radio channels used by base station 32, authenticating users, controlling handoffs between base station 32 and other radio access elements, and/or otherwise managing the interoperation of base stations 32 and interfacing base stations 32 with core network 40.

Base station 32 communicates wirelessly with wireless communication devices 20 to facilitate wireless communication for wireless communication devices 20. Base stations 32 may include any appropriate elements to communicate with wireless communication devices 20 and to interface wireless communication devices 20 with core network 40. For example, depending on the communications standards supported by access network 30 and core network 40, each base station 32 may represent or include a base station, a Node B, an evolved Node B (eNode B), a radio base station (RBS), an access point, or any other suitable element capable of communicating with wireless communication devices 20 wirelessly. Although FIG. 1 illustrates, for the sake of simplicity, only a single wireless communication device 20 and a single base station 32, wireless communication system 10 may include any suitable number and configuration of base stations 32 capable of serving any number of wireless communication devices 20 including, in particular embodiments, wireless communication devices 20 having different capabilities with respect to the carrier spectrums they support.

Core network 40 routes voice and/or data communicated by wireless communication devices 20 from access network 30 to other wireless communication devices 20 or to other communication devices coupled to core network 40 through landline connections or through other networks. Core network 40 may support any appropriate standards or techniques for routing such communications. For example, in embodiments of wireless communication devices 20 that support LTE, core network 40 may represent a System Architecture Evolution (SAE) core network. Core network 40 may also be responsible for aggregating communication for longhaul transmission, authenticating users, controlling calls, metering usage for billing purposes, or other functionality associated with providing communication services. In general, however, core network 40 may include any components suitable for routing and otherwise supporting voice and/or data communications for wireless communication devices 20.

In operation, wireless communication system 10 provides telecommunication service to wireless communication device 20. As part of this service, wireless communication device 20 wirelessly communicates data values periodically to access network 30, such as measurements, status indicators, or any other suitable values. In particular embodiments, the data values transmitted by wireless communication device 20 represent one of a predetermined and finite set of values. Alternatively, the data values may have an unlimited range, but a finite set of values within the range may be significantly more likely to be transmitted by wireless communication device 20. To improve the communication of these data values, wireless communication system 10 may implement improved transmitter and/or receiver techniques that leverage the limited range of possible or likely data values.

One example application for the described solutions may be in wireless networks that serve MTC devices. Many MTC devices transmit low-entropy data for which a small number of values are far more likely than other values to occur. For example, an MTC device may be configured to transmit a temperature for a location in which the temperature will be between 0° to 35° Celsius absent an unexpected change in circumstances (e.g., a fire or equipment malfunction) or may transmit an amount of rainfall for an area that consistently gets very little rain.

However, wireless communication system 10 may provide service for a number of different types of communication devices. The circumstances that allow these improved transmitter and/or receiver techniques to be used advantageously for the transmission of data values from wireless communication device 20 may not apply to other communication devices served by wireless communication system 10. For example, in particular embodiments, wireless communication device 20 may represent an MTC meter operating in a wireless communication system 10 that also provides wireless service to cellular telephones transmitting data in a far less predictable manner.

As a result, in particular embodiments, a node of access network 30 (base station 32 in the illustrated example) may determine that wireless communication device 20 is a type of device that would benefit from the use of these improved techniques. Base station 32 may make this determination in any suitable manner depending on the configuration or capabilities of base station 32. In particular embodiments, base station 32 may receive information from wireless communication device 32 indicating that wireless communication device 20 is an MTC device or a device that will engage in MTC transmissions and may make the device type determination based on this information. In alternative embodiments, base station 32 may detect characteristics of wireless communication device 20, such as the number or types of transmissions made by wireless communication device 20, and determine the relevant device type of wireless communication device 20 based on this detection. (Although the description below focuses, for purposes of illustration, on specific embodiments in which base station 32 is the network node responsible for such functionality as determining a device type of wireless communication device 20 and for requesting value information from wireless communication device 20, the functionality described for base station 32 may be performed by any suitable network node of access network 30.)

As one specific example, FIG. 1 illustrates an embodiment in which base station 32 receives a connection request 60, such as a Radio Resource Control (RRC) Connection Request, from wireless communication device 20 requesting that a radio connection be established between wireless communication device 20 and base station 32. In the illustrated example, connection request 60 includes information indicating that wireless communication device 20 is an MTC device or that wireless communication device 20 is a particular type of MTC device. For instance, connection request 60 may include a field that wireless communication device 20 sets to a particular value to indicate that wireless communication device 20 is an MTC device. Base station 32 may determine a device type for wireless communication device 20 using the information in connection request 60 and, based on this determination, decide that wireless communication device 20 is a device that would benefit from improved transmitter and/or receiver techniques associated with that device type.

To facilitate the implementation of the improved transmitter/receiver techniques, access network 30 may obtain value information describing the possible data values to be transmitted by wireless communication device 20. As used herein, "value information" may refer to any information that indicates, directly or indirectly, some or all of the data values that may be transmitted by the corresponding wireless communication device 20. In particular embodiments, the set of data values indicated by value information may represent the entire set of data values that wireless communication device 20 could possibly transmit. In alternative embodiments, the set of data values indicated by value information may represent some subset of all the data values that could possibly be transmitted by wireless communication device 20. For example, the value information may indicate a set of possible data values that represent the most likely data values to be transmitted, the data values that will be transmitted in particular circumstances (e.g., under normal operating conditions, in non-emergency situations), the data values expected to be transmitted based on historical data, or any other suitable subset of all possible data values.

Furthermore, the value information may indicate the relevant data values in any appropriate manner. As one example, base station 32 may receive from wireless communication device 20 value information that explicitly identifies each possible data value or explicitly identifies a range of data values that wireless communication device 20 may transmit. As another example, base station 32 may receive from wireless communication device 20 value information that represents an index or other identifier associated with a predetermined set of data values. In such embodiments, base station 32 may access previously stored information to identify a set of possible data values associated with the transmitted identifier. Furthermore, in particular embodiments, information indicating the device type of wireless communication device 20 may also represent the relevant value information. In such embodiments, after determining a device type for wireless communication device 20, base station 32 may access previously stored information to identify a set of possible data values associated with the device type of wireless communication device 20. In general, however, the value information may indicate the possible data values to base station 32 in any appropriate manner, and base station 32 may use the value information along with any other suitable information in any manner to determine the possible data values wireless communication device 20 may transmit.

In particular embodiments, base station 32 may request the value information from wireless communication device 20 when establishing a connection with wireless communication device 20, after determining that wireless communication device 20 has a device type suitable for using the improved receiver and/or transmitter techniques, or at any other suitable time during operation. In the illustrated example, base station 32 determines the device type of wireless communication device 20 when wireless communication device 20 attempts to establish a connection with base station 32 and, based on this determination, may request value information from wireless communication device 20. As a result, base station 32 responds to connection request 60 by transmitting a connection response 62 that requests wireless communication device 20 to provide information on the values that wireless communication device 20 will be transmitting. Connection response 62 may represent, for example, an RRC Connection Setup message that includes a field which base station 32 can set to instruct wireless communication device 20 to transmit value information. In the illustrated example, wireless communication device 20 then responds to connection response 62 with appropriate value information. More specifically, in the illustrated example, wireless communication device 20 provides the value information by transmitting a value information message 64 (e.g., an additional RRC message transmitted to base station 32) that includes the relevant value information.

Alternatively, wireless communication device 20 may provide the value information without any prompting from base station 32 (e.g., as part of its initial connection request 60). Furthermore, as noted above, the device type of wireless communication device 20 may, in certain embodiments, indicate to base station 32 the set of possible data values or other information about the data values that wireless communication device 20 may transmit. Thus, in such embodiments, the device type of wireless communication device 20 may represent the relevant value information, and wireless communication device 20 may not be required to communicate any other information indicating the data values wireless communication device 20 will transmit.

In addition to, or instead of, obtaining value information from wireless communication device 20, base station 32 may obtain from local memory value information that base station 32 maintains itself or may obtain value information from another component of access network 30. As one example, base station 32 may use value information received from wireless communication device 20, such as a device type of wireless communication device 20, to obtain from local storage a specific list of data values that may be transmitted by that particular device type. As another example, wireless communication device 20 may register with a particular component in wireless communication system 10 that is responsible for managing or monitoring certain types of communication devices operational in wireless communication system 10 (e.g., MTC devices). When wireless communication device 20 attempts to connect to base station 32, base station 32 may request additional value information pertaining to wireless communication device 20 from this component.

Once base station 32 has obtained the relevant value information from wireless communication device 20 and/or other sources, wireless communication device 20 may begin transmitting data values to base station 32. The data values transmitted by wireless communication device 20 may represent any suitable form of electronic data, including numeric values, text information, Boolean indicators, and/or any other type of data. In particular embodiments, base station 32 may use the obtained value information to decode, demodulate, and/or otherwise interpret wireless transmissions received from wireless communication device 20, thereby improving the likelihood that base station 32 will successfully interpret the data values contained in those wireless transmissions. Additionally, in particular embodiments, wireless communication device 20 may rely on the fact that base station 32 is aware of the possible data values to optimize encoding, modulation, and/or other aspects of transmission when sending data values to base station 32. While the availability of value information to base station 32 can be used to optimize operation in any suitable manner on the transmitting and/or receiving side in wireless communication system 10, the description below provides a few specific examples for purposes of illustration.

Improved Source Encoding

In particular embodiments, wireless communication device 20 source codes data values before transmitting the data values to base station 32. In particular embodiments, this source coding may utilize entropy encoding or another encoding scheme in which the number of encoded bits output for a particular data value is inversely related to the likelihood that wireless communication device 20 will transmit the relevant data value. For example, wireless communication device 20 may source code data values using an entropy encoding scheme such as Huffman coding or Lempel-Ziv-Welsh coding.

In such embodiments, wireless communication device 20 may also apply channel coding to increase the source-encoded data values resistance to noise or interference in the radio channel. Furthermore, the overall size of the encoded output after all encoding is completed may be fixed or otherwise limited. Thus, in particular embodiments, if fewer bits are used for source coding, this may allow more bits to be used for channel coding, resulting in greater resistance to noise and interference.

In addition to any channel or source coding, wireless communication device 20 may also perform additional processing on the data values to be transmitted. In particular embodiments, wireless communication device 20 may apply error detection information, such as a cyclic redundancy check (CRC) field, to the encoded bits that permit the receiving base station 32 to determine whether base station 32 correctly received and interpreted the transmitted data values. Additionally, wireless communication device 20 may modulate the encoded bits to produce a modulation symbol for groups of one or more encoded bits. For instance, wireless communication device 20 may use binary phase shift keying (BPSK), quadrature phase shift keying (QPSK), quadrature amplitude modulation (QAM), or any other suitable modulation scheme to translate the bits of the encoded data values into one or more modulation symbols.

After wireless communication device 20 has performed any appropriate encoding, modulation, and/or other processing, wireless communication device 20 transmits the data values to base station 32 wirelessly. Base station 32 receives the wireless transmission and attempts to interpret the data values. This may involve decoding the received transmission. As explained above, wireless communication device 20 may perform a combination of source and channel coding on the data values before transmitting them. As a result, in such embodiments, base station 32 performs a corresponding source decoding and channel decoding in an attempt to retrieve the original data values.

In particular embodiments, base station 32 may utilize the previously obtained value information to perform the source decoding. For example, as noted above, wireless communication device 20 may utilize a source-encoding scheme that encodes a data value into a number of encoded bits that is inversely related to the likelihood that wireless communication device 20 will transmit that particular value. The value information obtained by base station 32 may indicate a respective code word to which wireless communication device 20 will map each possible data value. The value information may indicate this mapping for each of the possible data values explicitly (e.g., by indicating a specific code word to be used for each data value) or implicitly (e.g., by indicating the frequency or probability of a particular data value being transmitted, which base station 32 can use to determine a corresponding code word). As a result, base station 32 may use the obtained value information to decode the source encoding performed on the transmitted data values.

Thus, in such embodiments, the base station's knowledge of the value information may facilitate use of an entropy encoding scheme or another encoding scheme that utilizes smaller code words for more frequently occurring data values. This may leave more bits available for channel coding when transmitting the most frequently occurring data values, permitting greater redundancy for those data values. By increasing the redundancy for the most frequently occurring data values, wireless communication system 10 may significantly reduce the overall number of failed transmissions and increase throughput. An example of how this improved source encoding may be implemented in particular embodiments of wireless communication system 10 is described in greater detail below with respect to FIG. 4A.

Improved Decoding and Demodulation

Base station 32 may also use knowledge of the possible data values obtained from the value information to assist in interpreting the received data values, possibly without any additional changes on the transmission side. In particular embodiments, this may involve base station 32 using the value information to eliminate impossible or unlikely candidates for the data values when attempting to interpret the wireless transmission. By using the obtained value information to eliminate impossible or unlikely candidates, base station 32 may reduce the likelihood that base station 32 will unknowingly misinterpret a received transmission or may permit base station 32 to correctly interpret the received transmission when it would otherwise have to request a re-transmission.

For example, wireless communication device 20 may transmit data values to base station 32 as part of a wireless transmission that contains one or more modulation symbols. To interpret the received transmission, base station 32 may attempt to demodulate these modulation symbols. As part of demodulating the received transmission, base station 32 may attempt to detect which modulation symbol or symbols were included in the received transmission. For instance, the value information obtained by base station 32 in a particular embodiment may indicate that wireless communication device 20 will be transmitting a Fahrenheit temperature for its current location encoded as an eight-bit value representing a temperature range of 0 to 180 degree. If wireless communication device 20 is using a 16 QAM modulation scheme, then wireless communication device 20 will transmit the measurements to base station 32 as two 16-QAM modulation symbols. In this case, if no unusual events have occurred (e.g., a fire at the location), the symbol corresponding to the four most significant bits for a particular temperature measurement should be a modulation symbol corresponding to a value of "0000" which would indicate the temperature measurement is below 90 degree. If base station 32 has uncertainty between symbols corresponding to "0000" and "1000" (or any other sequence of bits) during demodulation of the four most significant bits, base station 32 may utilize the value information to determine that "1000" is an impossible or highly improbable value for this particular modulation symbol and determine that the received symbol should be demodulated to a value of "0000."

Therefore, after obtaining value information, base station 32 may use this value information to limit the possible candidates considered when decoding code words and/or demodulating modulation symbols contained in wireless transmissions received from wireless communication device 20. An example of how a particular embodiment of base station 32 may implement these improved receiver techniques is described in greater detail below with respect to FIG. 4B.

Additionally, in particular embodiments, base station 32 may utilize value information to detect emergency conditions or other atypical situations suggested by unusual data values. For example, after receiving an unusually high temperature data value from wireless communication device 20, base station 32 may request the retransmission of this same measurement from the wireless communication device 20. After repeatedly receiving this unusually high temperature data value, base station 32 may determine that a fire may have occurred in the relevant location or that wireless communication device 20 has malfunctioned. In response, base station 32 may dispatch emergency services to the relevant location, notify a maintenance provider responsible for wireless communication device 20, and/or take other remedial action. Hence, the base station 32, or the wireless communications system 10 can be used to monitor a geographical area, or location where it is deployed in cooperation with the deployed communication devices similar to the communication device 20.

Thus, in particular embodiments wireless communication device 20 and/or base station 32 may utilize value information to implement various types of improved transmission and reception techniques. Although the description above describes implementations in which these improved techniques are used by default with a particular device type, wireless communication system 10 may be configured to utilize these optimized techniques selectively for the relevant device type. Consequently, in particular embodiments, wireless communication system 10 may only utilize the improved transmission/reception techniques facilitated by the value information under certain conditions.

As one example, wireless communication system 10 may only utilize these improved techniques for the re-transmission of a data value or set of data values, after wireless communication device 20 has failed to successfully transmit the relevant data values once or a threshold number of times. For instance, wireless communication device 20 may utilize a default source-encoding technique when initially transmitting a data value (e.g., the same encoding scheme used by non-MTC devices that base station 32 serves). Base station 32 may then determine whether it successfully received and decoded the transmitted data value (e.g., based on CRC information included in the wireless transmission) and transmit feedback information indicating success or failure to wireless communication device 20. Based on this feedback information, wireless communication device 20 may decide to re-transmit the relevant data value using the optimized source encoding described above, either for the first re-transmission or for a later re-transmission after base station 32 has requested re-transmission of the same data value(s) a predetermined number of times.

As another example, wireless communication device 20 or base station 32 may decide to implement these improved techniques based on current channel conditions. In such embodiments, wireless communication device 20 may determine based on channel measurements taken by wireless communication device 20 itself or based on instructions or information communicated by base station 32 that current channel conditions warrant use of the optimized source encoding described above. For instance, once signal strength on a particular channel falls below a specific threshold or after base station 32 has failed to correctly decode a certain number of transmissions in a communication session, base station 32 or wireless communication device 20 may decide that wireless communication device 20 should switch from a default source-encoding scheme to the improved source-coding scheme described above for subsequent transmissions in the communication station. If appropriate, the deciding device may then communicate this decision to the other device.

By using value information to implement improved transmission and reception techniques, wireless communication system 10 may increase the robustness of wireless transmission made by wireless communication device 20 and may reduce the frequency of errors in decoding and demodulation. Similarly, by using the described techniques, wireless communication device 20 may be able to achieve the same effective error rate using a lower transmission power. While the described solutions may be implemented with any type of wireless communication device 20, they may be particularly advantageous when implemented with MTC devices which often transmit a limited range of data values and typically face severe power constraints. Thus, certain embodiments of wireless communication system 10 may provide numerous operational benefits. Nonetheless, specific individual embodiments of wireless communication system 10 may provide some, none, or all of these benefits.

Figure 2:
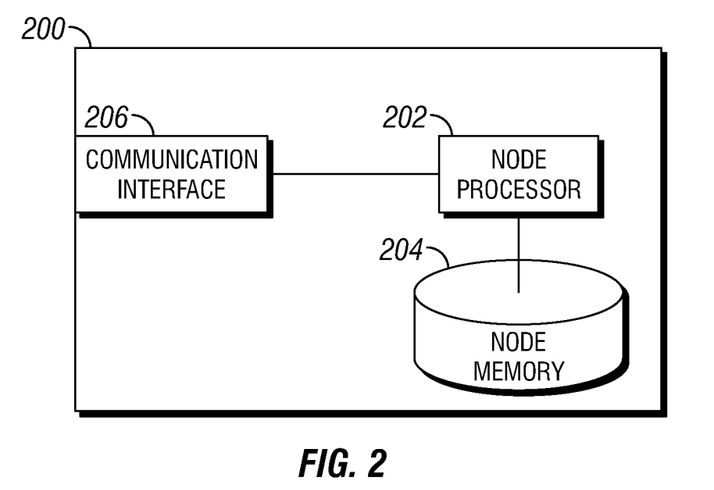
FIG. 2 is a block diagram illustrating a particular embodiment of a network node that may be utilized in the wireless communication system of FIG. 1.

FIG. 2 is a block diagram illustrating in greater detail the contents of a particular embodiment of a network node 200 that may be configured to utilize value information obtained from wireless communication device 20 to implement improved receiver techniques. Network node 200 may represent any suitable element of a radio access network capable of providing the described functionality, such as base station 32 in the embodiment illustrated by FIG. 1. As shown in FIG. 2, the example embodiment of network node 200 includes a node processor 202, a node memory 204, and a communication interface 206.

Node processor 202 may represent or include any form of processing component, including dedicated microprocessors, general-purpose computers, or other forms of electronic circuitry capable of processing electronic information. Examples of node processor 202 include field-programmable gate arrays (FPGAs), programmable microprocessors, digital signal processors (DSPs), application-specific integrated circuits (ASICs), and any other suitable specific- or general-purpose processors. Although FIG. 2 illustrates, for the sake of simplicity, an embodiment of network node 200 that includes a single node processor 202, network node 200 may include any number of node processors 202 configured to interoperate in any appropriate manner.

Node memory 204 stores value information obtained by network node 200, including any value information received from wireless communication device 20. Node memory 204 may also store processor instructions for node processor 202, coding algorithms, transmission parameters, and/or any other data utilized by network node 200 during operation. Node memory 204 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 2, node memory 204 may include one or more physical components local to or remote from network node 200.

Communication interface 206 comprises electronic circuitry and other components suitable to permit network node 200 to communicate with wireless communication device 20. For example, in embodiments in which network node 200 represents a node separate from the radio elements of access network 30 (e.g., a radio network controller), communication interface 206 may represent circuitry capable of communicating over a wireline connection between network node 200 and the radio elements of access network 30. In such embodiments, network node 200 may use communication interface 206 to transmit information to radio elements (such as a base station) that are capable of communicating wirelessly with wireless communication device 20. As an alternative example, in embodiments in which network node 200 itself represents a radio access element (such as an enhanced Node B (eNodeB) in a Long Term Evolution (LTE) system or another type of base station), communication interface 206 may instead include circuitry and components capable of communicating with wireless communication device 20 over a radio link, such as an antenna and radiofrequency transmitter and receiver.

Figure 3:
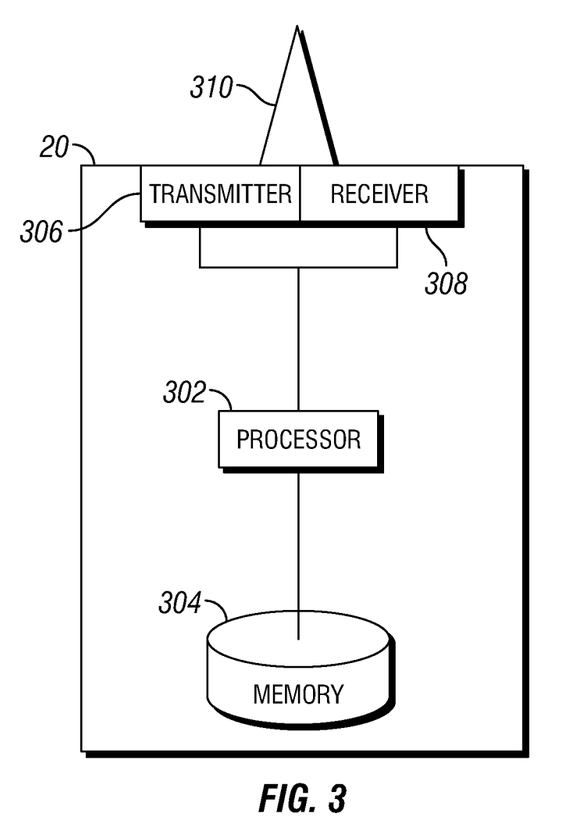
FIG. 3 is a block diagram illustrating a particular embodiment of a wireless communication device that may be utilized in the wireless communication system.

FIG. 3 is a block diagram illustrating in greater detail contents of a particular embodiment of wireless communication device 20. As shown in FIG. 3, the illustrated embodiment of wireless communication device 20 includes a processor 302, a memory 304, a transmitter 306, a receiver 308, and an antenna 310.

Processor 302 may represent or include any form of processing component, including dedicated microprocessors, general-purpose computers, or other devices capable of processing electronic information. Examples of processor 302 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of wireless communication device 20 that includes a single processor 302, wireless communication device 20 may include any number of processors 302 configured to interoperate in any appropriate manner.

Memory 304 stores processor instructions, configuration information, power control parameters, format definitions, and/or any other data utilized by wireless communication device 20 during operation. Memory 304 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3 memory 304 may include one or more physical components local to or remote from wireless communication device 20.

Antenna 310 represents any suitable conductor capable of receiving and transmitting wireless signals. Transmitter 306 transmits radiofrequency (RF) signals over antenna 310, and receiver 308 receives from antenna 310 RF certain signals transmitted by access network 30. Although the example embodiment in FIG. 3 includes certain numbers and configurations of antennas, receivers, and transmitters, alternative embodiments of wireless communication device 20 may include any suitable number of these components. Additionally, transmitter 306, receiver 308, and/or antenna 310 may represent, in part or in whole, the same physical components. For example, particular embodiments of wireless communication device 20 include a transceiver representing both transmitter 306 and receiver 308.

Figure 4A:
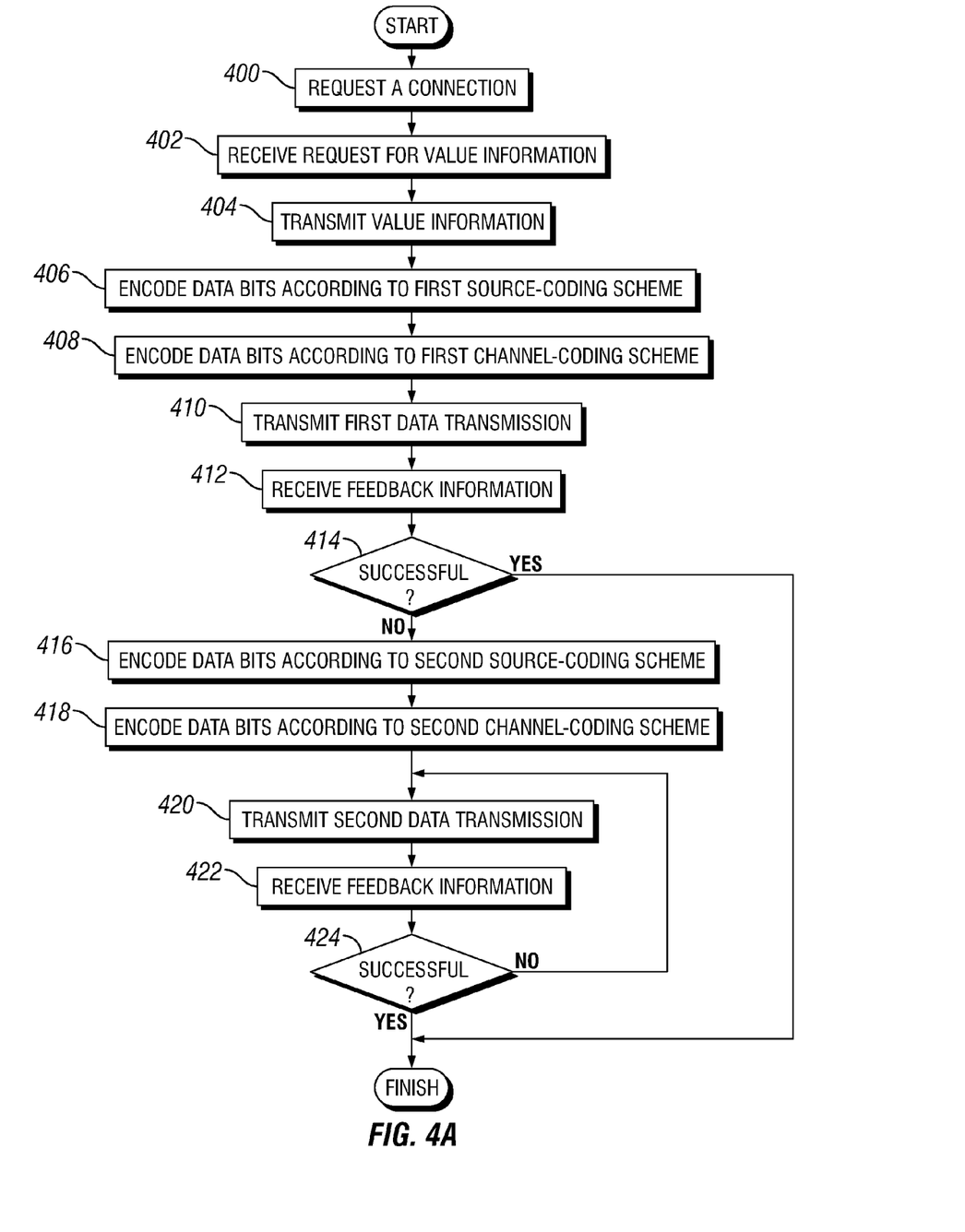
FIGS. 4A-4B and 5 are flowcharts showing example operation of various embodiments of the network node and wireless communication device.
Figure 4B:
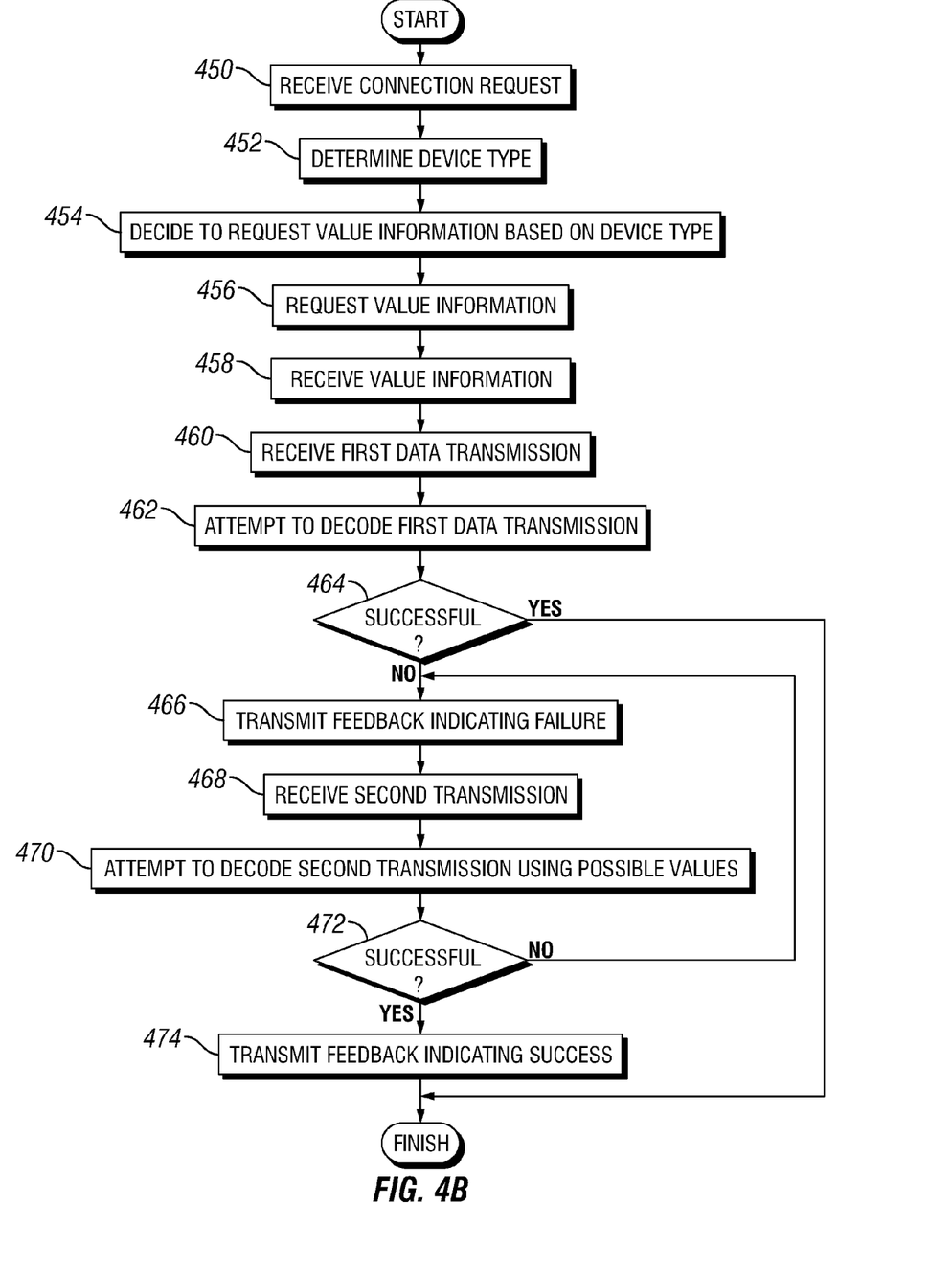

FIGS. 4A and 4B are flowcharts illustrating example operation of particular embodiments of wireless communication device 20 and network node 200, respectively, in communicating value information and utilizing this value information to implement improved transmission and/or reception techniques. More specifically, FIGS. 4A and 4B illustrate an example in which wireless communication device 20 utilizes improved source encoding techniques that network node 200 can decode using the value information. Furthermore, FIGS. 4A and 4B illustrate an example in which wireless communication device 20 and network node 200 are configured to implement the improved source coding/decoding techniques only after network node 200 has unsuccessfully failed to decode a particular data value. The steps illustrated in FIGS. 4A and 4B may be combined, modified, or deleted where appropriate. Additional steps may also be added to the example operation. Furthermore, the described steps may be performed in any suitable order.

In the illustrated example, operation begins for wireless communication device 20 with wireless communication device 20 requesting that a connection be established between wireless communication device 20 and network node 200 at step 400. Wireless communication device 20 may request the connection be established in any suitable manner. As explained above, in particular embodiments, wireless communication device 20 requests the connection by transmitting connection request 60 (e.g., an RRC Connection Request message) to network node 200 or another element of access network 30 in accordance with a radio access technology supported by access network 30. In particular embodiments, connection request 60 may include information indicating a device type associated with wireless communication device 20.

In the illustrated example, network node 200 responds by requesting value information from wireless communication device 20. Thus, at step 402, wireless communication device 20 receives a request for value information from network node 200. In particular embodiments, this request represents an RRC Connection Setup message with a predetermined field set to a specific value indicating that wireless communication device 20 should send appropriate value information to network node 200.

At step 404, wireless communication device 20 transmits value information to base station 32 (e.g., in a special RRC message specifically used for communicating value information). This value information indicates the data values to be transmitted by wireless communication device 20. As noted above, wireless communication device 20 may alternatively communicate the relevant value information to base station 32 without prompting from base station 32 (e.g., in an initial connection request). Additionally, in alternative embodiments, the value information may just represent an indication of a device type for wireless communication device 20, so wireless communication device 20 may only need to transmit a device type indication (e.g., a device category, an indication of a particular functionality or capability of wireless communication device 20, an indication that wireless communication device 20 will engage in a particular type of transmission) to network node 200 to communicate the relevant value information.

After network node 200 has obtained all appropriate value information, including any value information that network node 200 stores locally and any value information that network node 200 obtains from devices other than wireless communication device 20, wireless communication device 20 may begin to utilize source-coding techniques that rely on network node's possession of the value information. As explained above, wireless communication device 20 may use these source-coding techniques for all transmissions to network node 200 or may selectively utilize these source-coding techniques in specific circumstances. For instance, in the illustrated example, wireless communication device 20 refrains from utilizing the improved source-coding techniques for the initial transmission of any data values. However, if network node 200 fails to successfully decode the initial transmission, wireless communication device 20 uses the improved source-coding techniques for re-transmissions of those data values.

Thus, in FIG. 4A, wireless communication device 20 encodes a set of data bits in accordance with a first source-coding scheme (e.g., a default encoding scheme used by wireless communication system 10) at step 406. The data bits are representative of a particular data value to be communicated to network node 200. In particular embodiments, this first source-coding scheme may be associated with a corresponding channel-coding scheme (e.g., no channel coding or a channel-coding scheme with minimal redundancy). As a result, in the illustrated embodiment, wireless communication device 20 also encodes the data bits in accordance with a first channel-coding scheme that corresponds to the first source-coding scheme at step 408. This channel coding may be performed before, after, or in parallel with the source-coding, with either encoding process using an output of the other encoding process as its input rather than the raw unencoded data bits. Step 408 may involve no actual change to the original data bits and/or the source-coded data bits in embodiments in which the first channel-coding scheme involves no actual channel coding.

After any appropriate additional processing of the data bits (before or after encoding), such as modulation of the data bits or the insertion of CRC information, wireless communication device 20 transmits a wireless transmission that contains the encoded data bits to network node 200 at step 410. Upon receiving the wireless transmission, network node 200 attempts to decode the encoded data bits included in the wireless transmission. Network node 200 then transmits feedback information to wireless communication device 20 (e.g., an ACK or NACK message) indicating whether the decoding was successful. Thus, at step 412, wireless communication device 20 receives feedback information from network node 200.

Again, FIG. 4A illustrates example operation for an embodiment of wireless communication device 20 that utilizes improved source-coding techniques for re-transmissions of data values when network node 200 fails to successfully decode an initial transmission. Thus, in the illustrated example, wireless communication device 20 determines, at step 414, whether network node 200 successfully decoded the data bits transmitted in the original wireless transmission. If so, operation of wireless communication device 20 may end with respect to transmitting this particular data value, as shown in FIG. 4A. Wireless communication device 20 may then proceed as appropriate with transmitting other data values in a similar fashion.

However, if wireless communication device 20 determines that network node 200 did not successfully decode the data value, wireless communication device 20 may then encode the data bits in accordance with a second source-coding scheme at step 416. In particular embodiments, this second source-coding scheme takes advantage of the value information possessed by network node 200. Thus, in particular embodiments, the second source-coding scheme may represent an entropy-coding scheme, such as a Huffman coding scheme or a Lempel-Ziv-Welsh coding scheme, or another encoding scheme under which the possible data values to be transmitted by wireless communication device 20 are each associated with a respective code word based on a likelihood of transmission for that possible data value. Furthermore, in particular embodiments, under this second source-coding scheme, a size of the code word for a particular data value may depend, at least in part, on the likelihood that wireless communication device 20 will transmit that particular data value. Thus, under this second source-coding scheme, more frequently transmitted data values may be associated with smaller code words.

The second source-coding scheme may correspond to a second channel-coding scheme. As a result, in the illustrated embodiment, wireless communication device 20 encodes the data bits in accordance with a second channel-coding scheme at step 418. This second channel-coding scheme may introduce informational redundancy in the output code word. More specifically, in particular embodiments, the second channel-coding scheme may introduce a greater amount of redundancy than the first channel-coding scheme.

In particular embodiments, the second channel-coding scheme may utilize the same channel-coding algorithm as the first channel-coding scheme but the algorithm may be performed with a different target code rate. This may permit wireless communication device 20 to take advantage of the reduced size of the source-coded output resulting from the second source-coding scheme without having to support multiple different channel-coding algorithms. In particular embodiments, both the first channel-coding scheme and the second channel-coding scheme may implement a convolutional code or a linear block code, such as a repetition code, Reed-Muller code, or Hamming code. This may permit the described channel coding techniques to be implemented in devices with less software/hardware complexity than would be required to implement the turbo coding algorithms that are commonplace in such communication technologies as LTE.

After any appropriate additional processing of the data bits (before or after encoding), such as modulation of the data bits or insertion of CRC information, wireless communication device 20 transmits a second data transmission that contains the encoded data bits (i.e., the data bits encoded according to the second source-coding and channel-coding schemes) to network node 200 at step 420.

Upon receiving the second data transmission, network node 200 attempts to decode the encoded data bits included in the second wireless transmission. Network node 200 then transmits feedback information to wireless communication device 20 (e.g., an ACK or NACK message) indicating whether this decoding was successful. Thus, at step 422, wireless communication device 20 receives feedback information from network node 200. In the illustrated example, wireless communication device 20 determines, at step 424, whether network node 200 successfully decoded the data bits transmitted in the second wireless transmission. If not, wireless communication device 20 may attempt to transmit the second data transmission again (i.e., with the data bits encoded according to the second source-coding and channel-coding schemes), attempt to re-encode the data bits with a channel-coding scheme that provides even more redundancy, or take other appropriate steps to successfully communicate the data value to network node 200. In the illustrated example, operation of wireless communication device 20 returns to step 420. If, instead, wireless communication device 20 determines that network node 200 was able to successfully decode the data bits, operation of wireless communication device 20 may end with respect to transmitting this particular data value, as shown in FIG. 4A.

FIG. 4B illustrates example operation of network node 200 in conjunction with the example wireless communication device 20 described by FIG. 4A. In the example of FIG. 4B, operation of network node 200 begins with network node 200 obtaining value information indicating a set of possible data values associated with transmissions to be made by wireless communication device 20. In the embodiment described by FIG. 4B, network node 200 obtains value information from wireless communication device 20. An example of how this process may be implemented in certain embodiments is shown by steps 450-458 in FIG. 4B.

At step 450, network node 200 receives a connection request 60 from wireless communication device 20. In response to receiving connection request 60, network node 200 determines a device type of wireless communication device 20 at step 452. In particular embodiments, connection request 60 includes information indicating the relevant device type for wireless communication device 20 and network node 200 determines the device type for wireless communication device 20 based on connection request 60.

Based on the determined device type for wireless communication device 20, network node 200 decides whether to request value information from wireless communication device 20 at step 454. In the illustrated example, it is assumed that network node 200 decides, based on the device type of wireless communication device 20, to request value information from wireless communication device 20 and operation proceeds to step 456. If instead network node 200 decides that network node 200 does not need to request value information from wireless communication device 20, network node 200 may utilize conventional procedures in establishing a connection with wireless communication device 20 and in all subsequent communication with wireless communication device 20.

At step 456, network node 200 requests value information from wireless communication device 20. In particular embodiments, network node 200 requests the value information from wireless communication device 20 by transmitting a connection response 62 responsive to connection request 60. In the illustrated example, wireless communication device 20 responds to the request by transmitting value information to network node 200. As a result, network node 200 receives value information from wireless communication device 20 at step 458. As explained above, in alternative embodiments, network node 200 may also or instead obtain value information from local storage or other devices in access network 30.

After network node 200 has obtained the relevant value information, wireless communication device 20 may begin transmitting data values to network node 200. As in FIG. 4A, FIG. 4B illustrates an example in which wireless communication device 20 uses a first set of source-encoding and channel-encoding schemes to transmit an initial transmission of data values and a different set to transmit any re-transmission of the data values. Accordingly, at step 460, network node 200 receives a first data transmission from wireless communication device 20. This first data transmission includes a set of data bits representative of a particular data value wireless communication device 20 is attempting to communicate to network node 200. The data bits are encoded according to a first coding scheme. In particular embodiments, this means that the data bits are encoded in accordance with a first source-coding scheme and in accordance with a corresponding first channel-coding scheme.

At step 462, network node 200 attempts to decode the first data transmission. At step 464, network node 200 determines whether network node 200 successfully decoded the first data transmission. Network node 200 may determine this in any appropriate manner based on the configuration of wireless communication system 10. For example, in particular embodiments, network node 200 may utilize error detection information (e.g., CRC check information) included in the first data transmission to determine whether the decoding was successful. If network node 200 was successful in decoding the first data transmission, operation proceeds in the example to step 474 where network node 200 transmits feedback information (e.g., an ACK message) to wireless communication device 20 that indicates network node 200 successfully decoded the first data transmission. Operation of network node 200 may then end with respect to receiving this particular data value, as shown in FIG. 4B. Network node 200 may then proceed, as appropriate, to receive other data values transmitted by wireless communication device 20 in a similar fashion.

However, if network node 200 determines at step 464 that network node 200 was not successful in decoding the first data transmission, operation proceeds to step 466 where network node 200 transmits feedback information (e.g., a NACK message) to wireless communication device 20 that indicates network node 200 failed to properly decode the first data transmission. Wireless communication device 20 responds to such feedback information by using a different encoding scheme and re-transmitting the data bits in a second data transmission. Thus, at step 468, network node 200 receives a second data transmission from wireless communication device 20 that includes the set of data bits encoded in accordance with a second encoding scheme.

In particular embodiments, wireless communication device 20 responds to this feedback specifically by encoding the data bits in accordance with a second source-coding scheme and in accordance with a second channel-coding scheme associated with the second source-coding scheme. As explained above, the second source-coding scheme may represent an entropy-coding scheme or another encoding scheme in which the possible data values are each associated with a code word based on a likelihood of transmission for that data value. Additionally, the second channel-coding scheme may represent a channel-coding scheme that introduces more redundancy in the final encoded bits than the first channel-coding scheme.

Network node 200 then attempts to decode the second data transmission at step 470. In the illustrated example, network node 200 attempts to decode the second data transmission using the set of possible data values indicated by the value information. For example, in particular embodiments, network node 200 uses the set of possible data values and their corresponding source-coded code words to map the source-coded code word in the second data transmission to the original set of data bits. In the illustrated example, network node 200 may then determine (at step 472) whether it was successful in decoding the second data transmission and transmit feedback information indicating whether the decoding failed or succeeded to wireless communication device 20 (at steps 466 or 474, respectively). Depending on whether network node 200 was successful in decoding the second data transmission, operation of network node 200 with respect to receiving this particular data value may then end or return to step 418 as shown in FIG. 4B.

Figure 5:
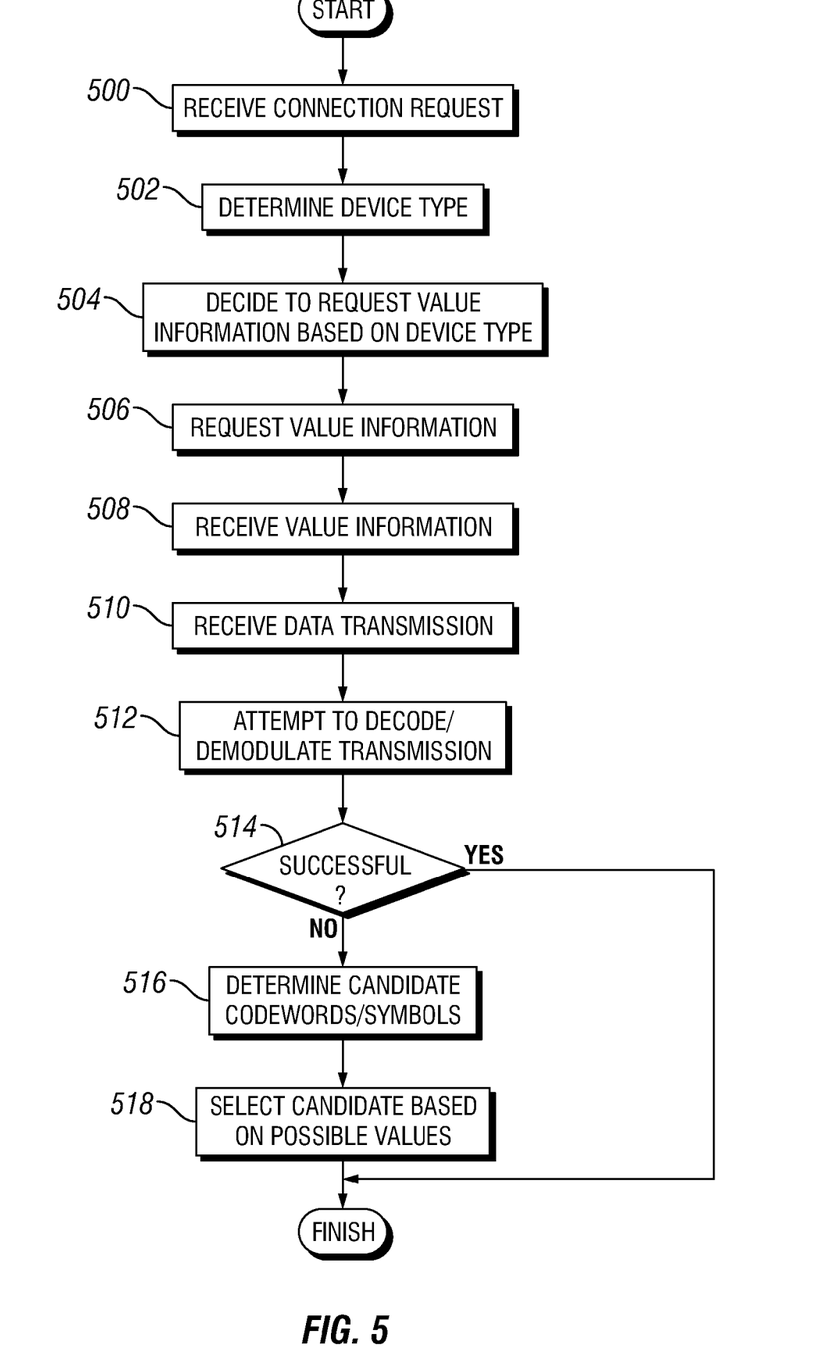

FIG. 5 illustrates an example operation of a particular embodiment of network node 200 in using value information to perform additional processing of received data transmission when network node 200 is unsuccessful in decoding and/or demodulating the data transmission using a default procedure. The solution described by FIG. 5 may be used separately from the solutions described by FIGS. 4A-4B, or instead may be used in conjunction with those techniques or other improved receiver techniques as appropriate. The steps illustrated in FIG. 5 may be combined with one another, modified, or deleted where appropriate. Additional steps may also be added to the example operation. Furthermore, the described steps may be performed in any suitable order.

Operation begins in FIG. 5 with network node 200 obtaining value information. As explained above, network node 200 may obtain value information in part or in whole from wireless communication device 20. Additionally or alternatively, network node 200 may obtain value information from local storage or other components of radio access network 30. In the example illustrated by FIG. 5, network node 200 obtains value information in a similar fashion to that described above with respect to FIGS. 4A and 4B. Thus, steps 500-508 are performed in an analogous manner to that described for the similarly-labeled steps 450-458 of FIG. 4B.

After obtaining value information, the operation of network node 200 proceeds with network node 200 receiving a data transmission from wireless communication device 20 at step 510. The data transmission includes a set of data bits representative of a data value wireless communication device 20 is attempting to communicate to network node 200. In particular embodiments, these data bits may be encoded in one or more code words and/or modulated into one or more modulation symbols carried by the received wireless transmission.

Network node 200 attempts to decode and/or demodulate the received data transmission at step 512. At step 514, network node 200 determines whether network node 200 successfully decoded the first data transmission. Network node 200 may determine this in any appropriate manner based on the configuration of wireless communication system 10. For example, in particular embodiments, network node 200 may utilize CRC information included in the first wireless transmission to determine whether the decoding and/or the demodulation was successful. If network node 200 was successful, network node 200 may transmit feedback information to wireless communication device 20 indicating successful decoding and demodulation of the data transmission, store or use the data value communicated by the data bits, or otherwise continue with any appropriate steps (not shown in FIG. 5) that are intended to follow successful reception of data from wireless communication device 20. Operation of network node 200 with respect to receiving and processing this particular data value may the end as shown in FIG. 5.

If instead network node 200 is unsuccessful in decoding and/or demodulating the received data transmission, network node 200 may then perform further processing of the data transmission using the possible set of data values indicated by the value information. As one example of this further processing, in the embodiment illustrated by FIG. 5, network node 200 attempts a second time to decode or demodulate the data bits in the received data transmission, this time using the set of possible values, as shown by steps 516 and 518. In particular embodiments, this may involve network node 200 determining one or more candidates for a code word or modulation symbol included in the received data transmission, as shown at step 516. In particular embodiments, these candidates may be determined as part of the default or conventional decoding/demodulation performed by network node 200, and thus, the candidates may be generated as part of step 512. After determining the candidates, network node 200 may select, from among the candidates, one or more code words or modulation symbols associated with the set of possible data values indicated by the value information, as shown at step 518. In particular embodiments, this may instead or additionally involve eliminating one or more candidate code words/modulation symbols that are not associated with possible data values indicated by the obtained value information. Operation of network node 200 with respect to receiving this particular data value from wireless communication device 20 may then end as shown in FIG. 5.

It is noted here that the proposed method of FIGS. 4A, 4B and 5 could coexist with classical retransmission and soft information combining schemes. In case there is a need to combine at the network node 200 information with different source and channel coding schemes originating from the communication device 20, then, some extra functionality at the network node 200 might be needed.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for receiving data transmitted wirelessly, comprising:
   receiving information indicating a device type associated with a wireless communication device;
   based on the device type associated with the wireless communication device, deciding to request information indicating a set of possible data values associated with transmissions from the wireless communication device;
   receiving information indicating the set of possible data values;
   receiving a data transmission from the wireless communication device that comprises encoded data bits; and
   attempting to decode the data transmission using the set of possible data values;
   wherein the data transmission comprises a second data transmission, and further comprising:
   receiving a first data transmission from the wireless communication device, wherein the first data transmission comprises a set of data bits encoded in accordance with a first encoding scheme;
   attempting to decode the first data transmission;
   determining whether the first data transmission was successfully decoded;
   in response to determining that the first data transmission was not successfully decoded, transmitting feedback to the wireless communication device indicating that the first data transmission was not successfully decoded;
   receiving the second data transmission from the wireless communication device, wherein the second data transmission comprises the set of data bits encoded in accordance with a second encoding scheme; and
   attempting to decode the second data transmission using the set of possible data values, and
   wherein the second encoding scheme comprises an entropy encoding scheme according to which each of the possible data values is associated with a respective code word based on a likelihood of transmission for that possible data value.

2. The method of claim 1, wherein under the second encoding scheme a most likely value to be transmitted is associated with a shortest code word.

3. The method of claim 1, wherein obtaining information indicating the set of possible data values comprises:
   transmitting a request for possible data values to the wireless communication device; and
   receiving from the wireless communication device information indicating the set of possible data values.

4. The method of claim 1, wherein determining whether the first data transmission was successfully decoded comprises performing a cyclic redundancy check on the decoded first data transmission.

5. The method of claim 1, wherein attempting to decode the second data transmission comprises:
   decoding the second transmission in accordance with a channel coding scheme; and
   decoding the second transmission in accordance with a source coding scheme according to which each of the possible data values is associated with a code word.

6. A method for receiving data transmitted wirelessly, comprising:
   encoding a set of data bits in accordance with a first encoding scheme;
   transmitting a first data transmission to a radio network node, wherein the first data transmission includes the set of data bits encoded in accordance with the first encoding scheme;
   receiving feedback information indicating that the first data transmission was not successfully decoded by the radio network node;
   in response to the feedback information:
      encoding the set of data bits in accordance with a second encoding scheme according to which each of a set of possible data values for the set of data bits is associated with a code word based on a likelihood of transmission;
      transmitting a second data transmission to the radio network node, wherein the second data transmission comprises the set of data bits encoded in accordance with the second encoding scheme;
   wherein the method further comprises:
   receiving a request for possible data values from the radio network node; and
   transmitting information indicating the set of possible data values to the radio network node, and
   wherein the second encoding scheme comprises an encoding scheme according to which a most likely value to be transmitted is associated with a shortest code word.

7. The method of claim 6, wherein the second encoding scheme comprises an encoding scheme according to which each of the possible data values for the set of data bits is associated with a respective code word having a length that depends on a likelihood of that possible data value being transmitted.

8. The method of claim 7, wherein encoding the set of data bits in accordance with the second encoding scheme comprises generating a first code word based on the set of data bits, and wherein the method further comprises encoding the first code word in accordance with a third encoding scheme, wherein the third encoding scheme comprises a channel coding scheme that produces a second code word having a predetermined length regardless of the length of the first code word.

9. The method of claim 8, wherein the third encoding scheme comprises a linear block code.

10. An apparatus for receiving data transmitted wirelessly, comprising:
    a receiver configured to receive information transmitted wirelessly by a wireless communication device;
    a processor configured to:
       receive information indicating a device type associated with a wireless communication device;
       based on the device type associated with the wireless communication device, decide to request information indicating a set of possible data values associated with transmissions horn the wireless communication device;

receive information indicating the set of possible data values;

receive a data transmission from the wireless communication device that comprises encoded data bits; and attempt to decode the data transmission using the set of possible data values;

wherein the data transmission comprises a second data transmission, and wherein the processor is further configured to:

receive a first data transmission from the wireless communication device, wherein the first data transmission comprises a set of data bits encoded in accordance with a first encoding scheme;

attempt to decode the first data transmission;

determine whether the first data transmission was successfully decoded;

in response to determining that the first data transmission was not successfully decoded, transmit feedback to the wireless communication device indicating that the first data transmission was not successfully decoded;

receive the second data transmission from the wireless communication device, wherein the second data transmission comprises the set of data bits encoded in accordance with a second encoding scheme; and attempt to decode the second data transmission using the set of possible data values, and wherein the second encoding scheme comprises an entropy encoding scheme according to which each of the possible data values is associated with a respective code word based on a likelihood of transmission for that possible data value.

11. The apparatus of claim 10, wherein, under the second encoding scheme, a most likely value to be transmitted is associated with a shortest code word.

12. The apparatus of claim 10, wherein the processor is configured to obtain information indicating the set of possible data values by:

transmitting a request for possible data values to the wireless communication device; and receiving from the wireless communication device information indicating the set of possible data values.

13. The apparatus of claim 10, wherein the processor is configured to determine whether the first data transmission was successfully decoded by performing a cyclic redundancy check on the decoded first data transmission.

14. The apparatus of claim 10, wherein the processor is configured to attempt to decode the second data transmission by:

decoding the second transmission in accordance with a channel coding scheme; and decoding the second transmission in accordance with a source coding scheme according to which each of the possible data values is associated with a code word.

15. An apparatus for receiving data transmitted wirelessly, comprising:

a receiver configured to receive information transmitted wirelessly by a wireless communication device;

a processor configured to:

encode a set of data bits in accordance with a first encoding scheme;

transmit a first data transmission to a radio network node, wherein the first data transmission includes the set of data bits encoded in accordance with the first encoding scheme;

receive feedback information indicating that the first data transmission was not successfully decoded by the radio network node;

in response to the feedback information:

encode the set of data bits in accordance with a second encoding scheme according to which each of a set of possible data values for the set or data bits is associated with a code word based on a likelihood of transmission;

transmit a second data transmission to the radio network node, wherein the second data transmission comprises the set of data bits encoded in accordance with the second encoding scheme;

wherein the second encoding scheme comprises an entropy encoding scheme according to which each of the possible data values is associated with a respective code word based on a likelihood of transmission for that possible data value.

16. The apparatus of claim 15, wherein the processor is further configured to:

receive a request for possible data values from the radio network node; and transmit information indicating the set of possible data values to the radio network node.

* * * * *

UNITED STATES PATENT AND TRADEMARK OFFICE
CERTIFICATE OF CORRECTION

PATENT NO. : 8,824,598 B2
APPLICATION NO. : 13/717864
DATED : September 2, 2014
INVENTOR(S) : Dimou et al.

Page 1 of 1

It is certified that error appears in the above-identified patent and that said Letters Patent is hereby corrected as shown below:

In the Specification

In Column 5, Line 47, delete "device 32" and insert -- device 20 --, therefor.

In the Claims

In Column 21, Line 2, in Claim 10, delete "horn" and insert -- from --, therefor.

In Column 22, Line 28, in Claim 15, delete "set or" and insert -- set of --, therefor.

Signed and Sealed this
Fifth Day of July, 2016

Michelle K. Lee
*Director of the United States Patent and Trademark Office*